US008988032B2

(12) United States Patent
Iwashita et al.

(10) Patent No.: US 8,988,032 B2
(45) Date of Patent: Mar. 24, 2015

(54) NUMERICAL CONTROLLER HAVING DISPLAY FUNCTION FOR TRAJECTORY OF TOOL

(75) Inventors: Yasusuke Iwashita, Minamitsuru-gun (JP); Hajime Ogawa, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/564,989

(22) Filed: Aug. 2, 2012

(65) Prior Publication Data

US 2013/0076287 A1 Mar. 28, 2013

(30) Foreign Application Priority Data

Sep. 26, 2011 (JP) ................................. 2011-209033

(51) Int. Cl.
*G05B 19/18* (2006.01)
*G05B 19/4068* (2006.01)

(52) U.S. Cl.
CPC .. *G05B 19/4068* (2013.01); *G05B 2219/35349* (2013.01)
USPC ...... 318/569; 318/568.25; 318/600; 318/570; 318/601; 700/180; 700/181; 700/192; 700/188; 715/771; 715/781

(58) Field of Classification Search
USPC ................. 318/561, 562, 570, 601, 569, 574; 700/188, 187, 189, 192, 61, 180, 110, 700/177; 702/41, 141, 152; 345/442
See application file for complete search history.

(56) References Cited

U.S. PATENT DOCUMENTS

| 4,881,021 | A | * | 11/1989 | Hirai | 318/569 |
| 5,537,016 | A | | 7/1996 | Barg et al. | |
| 6,463,667 | B1 | * | 10/2002 | Ushio et al. | 33/502 |
| 6,744,233 | B1 | * | 6/2004 | Tsutsui | 318/560 |
| 2003/0052882 | A1 | | 3/2003 | Sinn | |
| 2007/0046677 | A1 | * | 3/2007 | Hong et al. | 345/442 |
| 2011/0015877 | A1 | * | 1/2011 | Okita et al. | 702/41 |
| 2011/0050686 | A1 | * | 3/2011 | Nojima et al. | 345/419 |
| 2011/0057599 | A1 | * | 3/2011 | Iwashita et al. | 318/601 |
| 2011/0246132 | A1 | * | 10/2011 | Sato et al. | 702/150 |

FOREIGN PATENT DOCUMENTS

DE 42 31 613 A1 3/1994
DE 4231613 A1 * 3/1994

(Continued)

*Primary Examiner* — Kawing Chan
*Assistant Examiner* — Jorge L Carrasquillo
(74) *Attorney, Agent, or Firm* — Drinker Biddle & Reath LLP

(57) ABSTRACT

A numerical controller capable of visually and accurately analyzing a change of the tool trajectory before and after changing a processing condition, whereby a parameter of a drive axis can be properly adjusted. The numerical controller comprises a numeric controlling part which controls each drive axis based on a predetermined position command; a position data obtaining part which obtains position data of each drive axis controlled by the numerical controlling part; a tool coordinate calculating part which calculates a coordinate of a tool center point based on position feedback or obtained position data of each drive axis and information of a mechanical structure of a machine tool; a tool trajectory storing part which stores the calculated coordinate of the tool center point as a feedback trajectory; and a displaying part which displays the stored feedback trajectory on a display.

2 Claims, 5 Drawing Sheets

(56) References Cited

FOREIGN PATENT DOCUMENTS

| | | |
|---|---|---|
| DE | 196 37 632 A1 | 4/1997 |
| DE | 101 45 515 A1 | 4/2003 |
| JP | 6-59717 | 3/1994 |
| JP | 2003-75472 | 3/2003 |
| JP | 2003075472 A * | 3/2003 |
| JP | 2006-227886 | 8/2006 |
| JP | 2010-237843 | 10/2010 |
| JP | 2011-22666 | 2/2011 |

* cited by examiner

NUMERICAL CONTROLLER HAVING DISPLAY FUNCTION FOR TRAJECTORY OF TOOL

BACKGROUND OF THE INVENTION

1. Field of the Invention

The present invention relates to a numerical controller having a function for displaying a trajectory of a representative point, such as a tool center point, of a machine tool.

2. Description of the Related Art

In the prior art, as a method for monitoring an error in a shape of a machined object, a tool trajectory displaying method has been used, wherein a commanded trajectory of a representative point (such as a tool center point) of a machine tool and a feedback trajectory obtained when the representative point is actually moved according to the command are overlapped and displayed so that an error of the feedback trajectory relative to the commanded trajectory is visually monitored. For example, Japanese Unexamined Patent Publication (Kokai) No. 2003-75472 discloses a technique for displaying two servo information waveforms based on servo information from a controller, wherein the two waveforms are overlapped with each other within a single display frame.

Japanese Unexamined Patent Publication (Kokai) No. 6-59717 discloses an NC device having a function for overlapping a movement trajectory of a tool generated by analyzing an NC program with positional data obtained when the tool is moved according to the movement path.

Japanese Unexamined Patent Publication (Kokai) No. 2006-227886 discloses a servo controller and a method of adjusting a servo system, and describes "a sine arc instruction is given to the servo system as a move instruction having periodicity. Position feedback data and data before one quarter cycle or after one quarter cycle or position data based on the position instruction before one quarter cycle or after one quarter cycle are converted into each position data of the X-axis and the Y-axis, and an obtained image is drawn on the two-dimensional plane (X-Y plane)."

Further, Japanese Unexamined Patent Publication (Kokai) No. 2011-22666 discloses an analyzing/editing device of an NC program, having means for displaying a tool trajectory and drawings of drilling and a workpiece, wherein the tool trajectory and the drawings are overlapped with each other.

In the prior art, since feedback trajectories, before and after changing a processing condition such as processing speed, cannot be displayed while being overlapped with each other, it is necessary to separately display each trajectory on different displays in order to visually compare the trajectories. Therefore, in the prior art, the difference of the trajectories between before and after changing the processing condition cannot be accurately evaluated.

For example, although Japanese Unexamined Patent Publication (Kokai) No. 2003-75472 discloses the overlapping with reference to a time axis, this document does not describe the overlapping of data, such as a tool trajectory, which does not depend on the time axis. Although Japanese Unexamined Patent Publication (Kokai) No. 6-59717 and Japanese Unexamined Patent Publication (Kokai) No. 2006-227886 disclose that the feedback trajectory is overlapped with the commanded trajectory, these documents do not describe that a plurality of feedback trajectories are overlapped with each other. Further, although Japanese Unexamined Patent Publication (Kokai) No. 2011-22666 discloses that the tool trajectory, the processed shape of the workpiece and the drilled workpiece are overlapped with each other, this document does not describe a method for overlapping a plurality of feedback trajectories with each other.

SUMMARY OF THE INVENTION

An object of the present invention is to provide a numerical controller capable of accurately monitoring and analyzing a change of the tool trajectory before and after changing a processing condition.

According to the present invention, a numerical controller is provided, comprising: a numeric controlling part which controls at least one drive axis of a machine tool; a tool coordinate calculating part which calculates a first feedback trajectory of a representative point of a tool based on position feedback of the drive axis and information of a mechanical structure of the machine tool; a tool trajectory storing part which stores the first feedback trajectory; and a displaying part which displays the first feedback trajectory, wherein the displaying part displays at least one past second feedback trajectory which is stored in the tool trajectory storing part on the first feedback trajectory displayed on the displaying part so that the second feedback trajectory is overlapped with the first feedback trajectory.

In a preferred embodiment, the displaying part displays a commanded trajectory of the representative point of the tool which is calculated based on a position command for controlling the drive axis and the information of the mechanical structure of the machine tool, and further displays one or more first and second feedback trajectories while overlapping the first and second feedback trajectories with the commanded trajectory.

In a preferred embodiment, the commanded trajectory or the first and second feedback trajectories are obtained by projecting a three-dimensional trajectory on a two-dimensional plane.

In a preferred embodiment, the displaying part displays an error of the first and second feedback trajectories relative to the commanded trajectory or an error between the first and second feedback trajectories, while enlarging the magnitude of the error only in an error direction.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
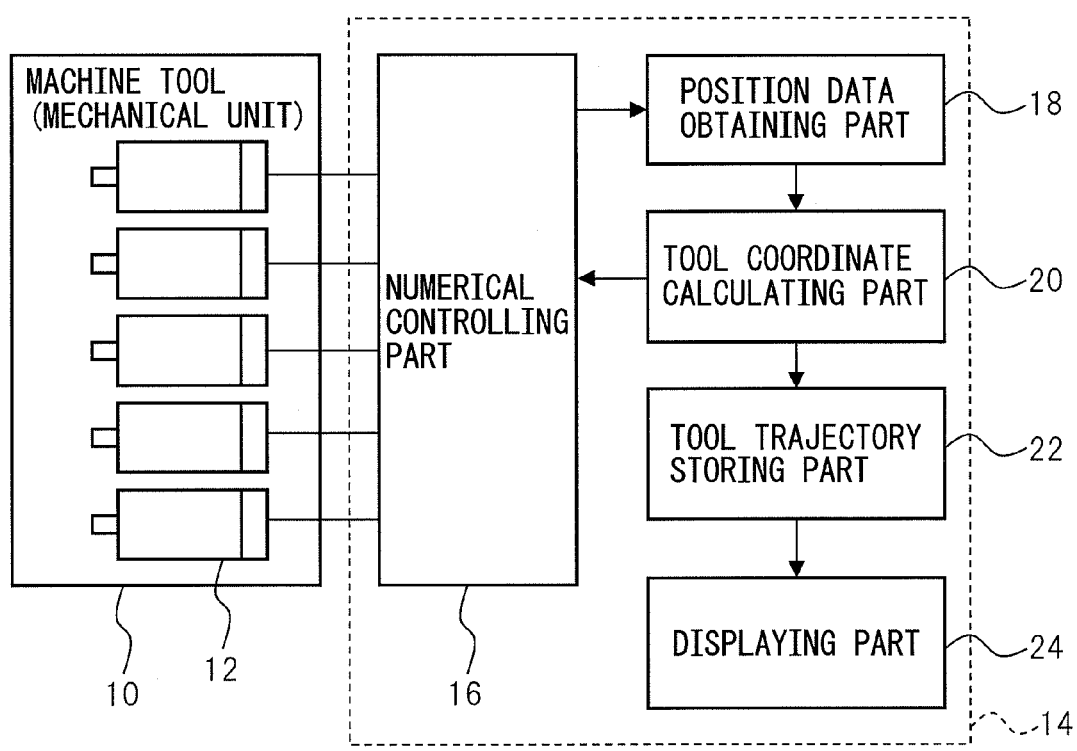
FIG. 1 is a block diagram showing a schematic configuration of a numerical controller according to an embodiment of the present invention.

FIG. 1 shows an example of a system configuration, including a numerical controller having a trajectory displaying function according to the present invention. A machine tool (mechanical unit) 10 has at least one (five in the illustrated embodiment) drive axis 12 such as a servomotor, and each drive axis 12 is controlled by a numerical controller (CNC) 14. Numerical controller 14 has a numerical controlling part 16 which controls each drive axis 12 based on a predetermined position command, a position data obtaining part 18 which obtains position data of each drive axis 12 controlled by numerical controlling part 16, a tool coordinate calculating part 20 which calculates a feedback trajectory or a coordinate of a representative point of a tool (for example, a tool center point) based on position feedback or obtained position data of each drive axis and information of each component of a mechanical structure of machine tool 10, a tool trajectory storing part 22 which stores the calculated coordinate of the representative point of the tool as a feedback trajectory, and a displaying part 24 such as a monitor which displays the stored feedback trajectory on a display.

Numerical controller 16 carries out feedback control of each axis 12 based on the predetermined position command. Position data obtaining part 18 may obtain the position command of each drive axis 12 from numerical controller 16, and tool coordinate calculating part 20 may calculate a commanded trajectory of the tool center point based on the position command and information of the mechanical structure of machine tool 10. Position data obtaining part 18 may obtain the position feedback of each drive axis 12 measured by measurement means (not shown) such as an encoder, and tool coordinate calculating part 20 may calculate a feedback trajectory of the representative point of the tool (for example, the tool center point) based on the position feedback. The commanded trajectory and the feedback trajectory of the representative point of the tool (for example, the tool center point) calculated by tool coordinate calculating part 20 are stored in tool trajectory storing part 22. Displaying part 24 displays the commanded trajectory and the feedback trajectory stored in tool trajectory storing part 22 on a positional coordinate system on a display, as described below.

Figure 2:
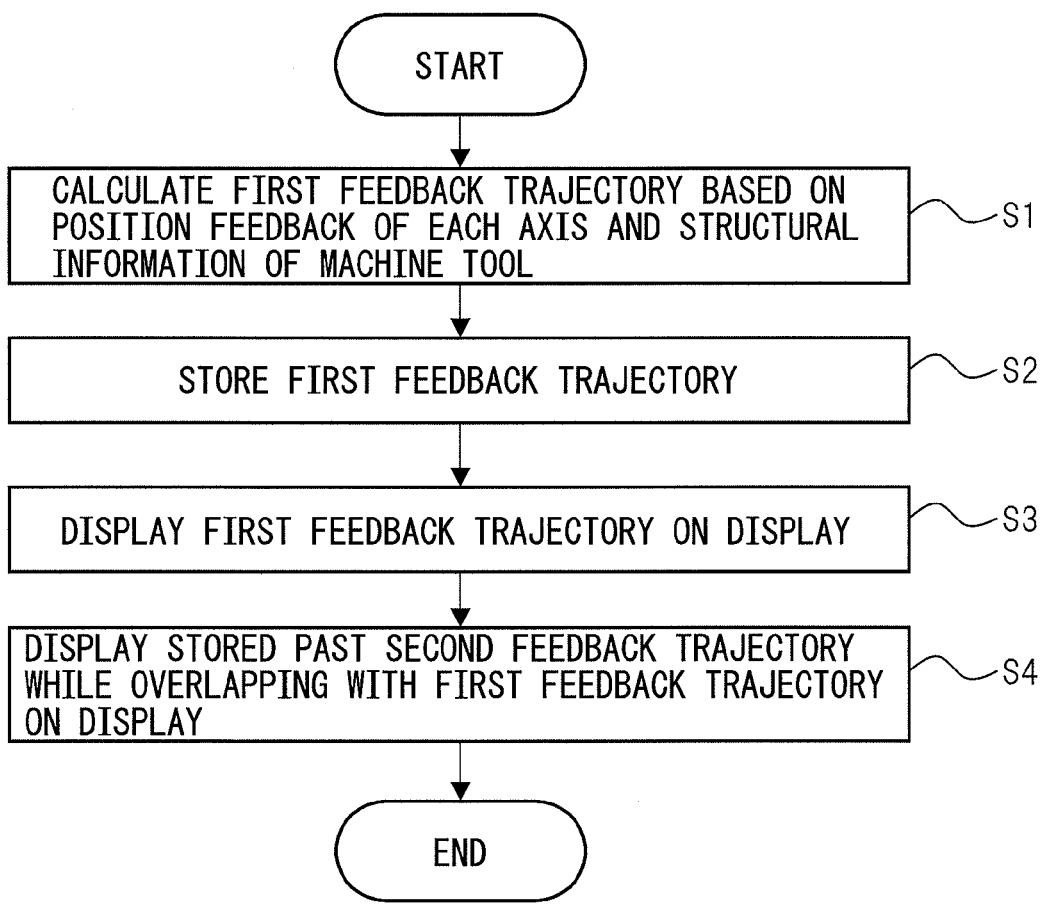
FIG. 2 shows a flowchart indicating one example of the procedure of the numerical controller.

FIG. 2 shows a flowchart indicating one example of the procedure of the numerical controller of the invention. First, in step S1, tool coordinate calculating part 20 calculates a movement trajectory of the representative point of the tool (for example, the tool center point), as a first feedback trajectory, based on the position feedback of each drive axis 12 and information of each component of the machine tool. The first feedback trajectory is stored in tool trajectory storing part 22 (step S2).

In the next step S3, the first feedback trajectory is displayed on displaying part 24. Further, in the next step S4, a second feedback trajectory, which is stored as past data, is displayed while being overlapped with the first feedback trajectory on displaying part 24 (concretely, two feedback trajectories are displayed on the same coordinate system). Generally, in comparison to the first feedback trajectory, the (commanded) trajectory regarding the second feedback trajectory, through which the representative point of the tool (for example, the tool center point) should pass, is the same as the commanded trajectory regarding the first feedback trajectory. However, the second feedback trajectory is the trajectory of the representative point of the tool (for example, the tool center point) obtained by controlling each axis 12 of machine tool 10 under the movement condition (for example, the movement speed and/or gain parameter) which is different from the movement condition regarding the first feedback condition. The second feedback trajectory is previously stored in tool trajectory storing part 22, in the procedure similar to steps S1 and S2 as described above.

Prior to step S1 or at another proper timing, a step for displaying the commanded trajectory on the display may be added. Concretely, the commanded trajectory of the representative point of the tool (for example, the tool center point) is calculated based on the position commanded of each axis and the structural information of the machine tool, and then the calculated commanded trajectory is displayed on the coordinate system of the feedback trajectory while being overlapped with the feedback trajectory. Due to this, the feedback trajectory can be easily compared to the commanded trajectory, and a parameter or the like of the drive axis can be rapidly and properly adjusted.

Figure 3:
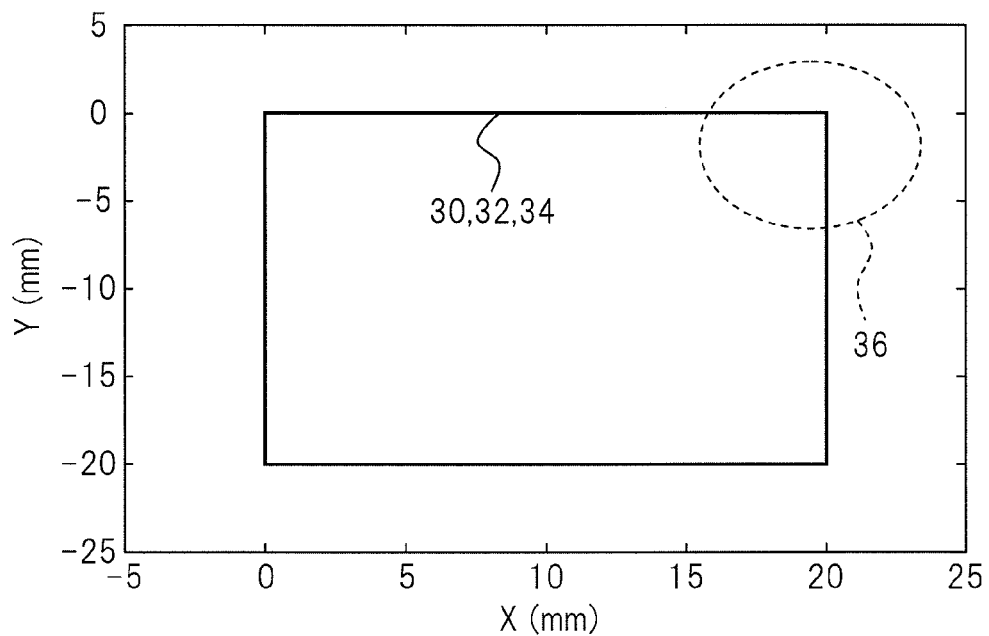
FIG. 3 is a diagram showing an example wherein a rectangular commanded trajectory and two feedback trajectories of different processing conditions are displayed while being overlapped with each other.

FIG. 3 shows a display example of displaying part 24 of numerical controller 14 of the invention. Concretely, FIG. 3 shows feedback trajectories 32 and 34 of the tool center point obtained by operating the machine tool under different two processing conditions (or movement conditions of the tool), in case that cutting, laser processing or welding is carried out by moving the tool center point along a square commanded trajectory 30 wherein dimensions of horizontal (X) and vertical (Y) axes are 20 mm. In the example of FIG. 3, commanded trajectory 30 and two feedback trajectories 32 and 34 are displayed on the same position coordinate system (X-Y coordinate system) while being overlapped with each other. However, at the display magnification in FIG. 3, it is difficult to identify the difference between the three trajectories.

Figure 4:
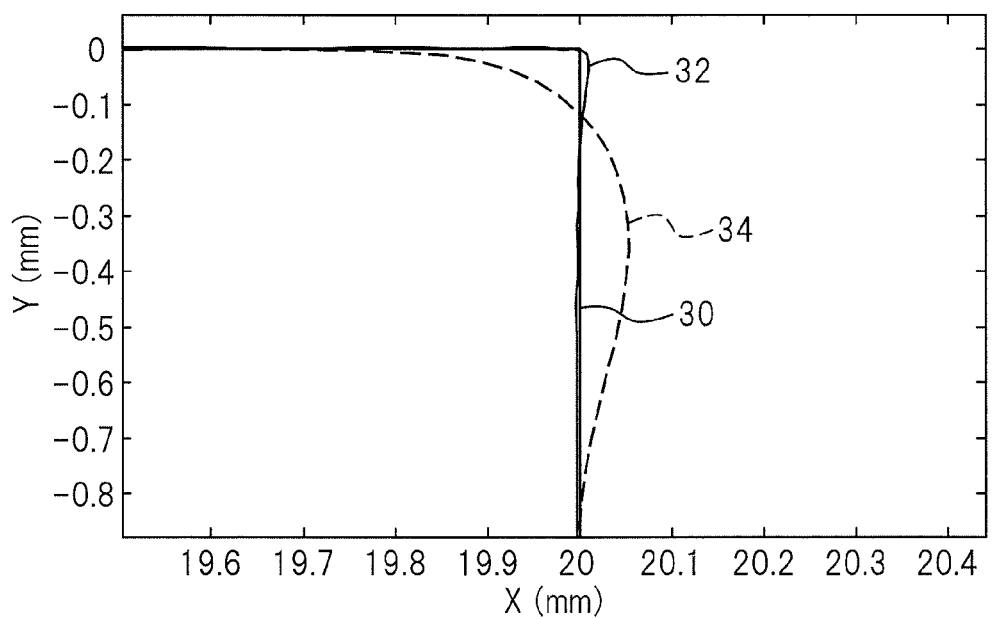
FIG. 4 is an enlarged view of a corner of the rectangular of FIG. 3.

Then, as shown in FIG. 4, displaying part 24 may enlarge a portion (or a corner) 36 of the trajectory shown in FIG. 3. For example, in the case of FIG. 4, when feedback trajectory 32 of the tool center point is obtained by carrying out processing under first processing condition, an error can be found near the corner of commanded trajectory 30 by overlapping first feedback trajectory 32 with commanded trajectory 30. On the other hand, before first feedback trajectory 32 is obtained, second feedback trajectory 34 (indicated by a dashed line) of the tool center point is obtained by carrying out processing under second processing condition, and second feedback trajectory 34 is previously stored in tool trajectory storing part 22. In this case, by overlapping second feedback trajectory 34 with first feedback trajectory 32 (i.e., by displaying second feedback trajectory 34 on the same coordinate system as first feedback trajectory 32), the difference between the feedback trajectories (i.e., a change due to the difference of processing conditions) can be easily and visually observed. For example, in the case of FIG. 4, in comparison to second feedback trajectory 34, first feedback trajectory 32 is significantly improved in view of the magnitude of the error relative to commanded trajectory 30.

Figure 5:
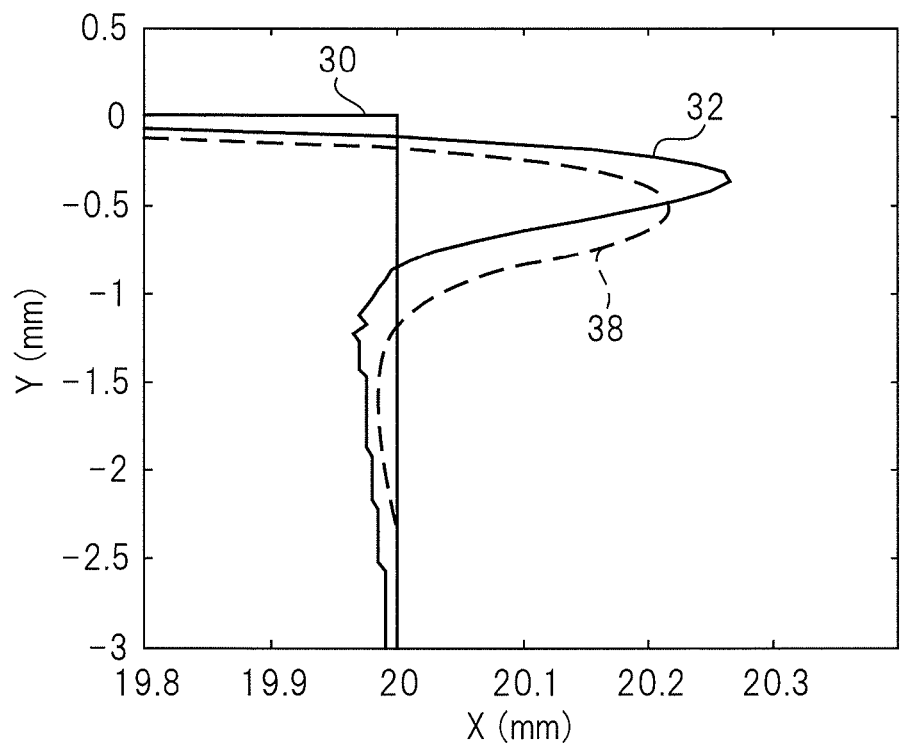
FIG. 5 is a diagram showing an example wherein errors of two feedback trajectories relative to the commanded trajectory are enlarged.

As shown in FIG. 4, by merely enlarging the portion of the trajectory, the error of the feedback trajectory relative to the commanded trajectory or the error between the feedback trajectories may not be clear. In such a case, as shown in FIG. 5, it is effective to enlarge the feedback trajectory to be compared, only in an error direction to be emphasized (in the X-direction in the example of FIG. 5). In FIG. 5, first feedback trajectory 32 is five times enlarged only in the X-direction and displayed relative to commanded trajectory 30, and the first feedback trajectory is compared to a third feedback trajectory 38 (indicated by a dashed line) which is also five times enlarged only in the X-direction. The third feedback trajectory is obtained by carrying out processing under third processing condition which is relatively similar to the first processing condition.

Figure 6:
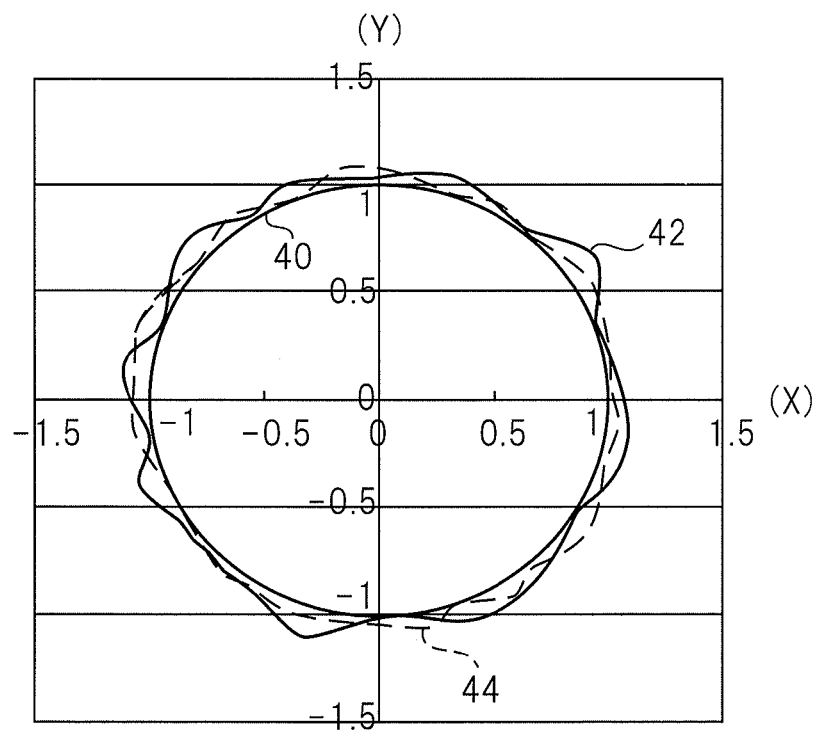
FIG. 6 is a diagram showing an example wherein errors of two feedback trajectories relative to the commanded trajectory are enlarged when the commanded trajectory is a circle.

FIG. 6 shows an example wherein feedback trajectories are overlapped with each other, when a commanded trajectory is a circle. In the case that processing is carried out regarding a circular commanded trajectory 40 while moving both the X- and Y-axes, an error is hardly to be visually observed in many cases when the obtained feedback trajectory is overlapped with the commanded trajectory without being enlarged. Then, as shown in FIG. 6, it is effective to (for example, ten times) enlarge two feedback trajectories 42 and 44, obtained by different processing conditions, in an error direction (or in a radial direction). Due to this, the difference between the feedback trajectories due to the change of processing condition may be easily and visually observed.

Figure 7:
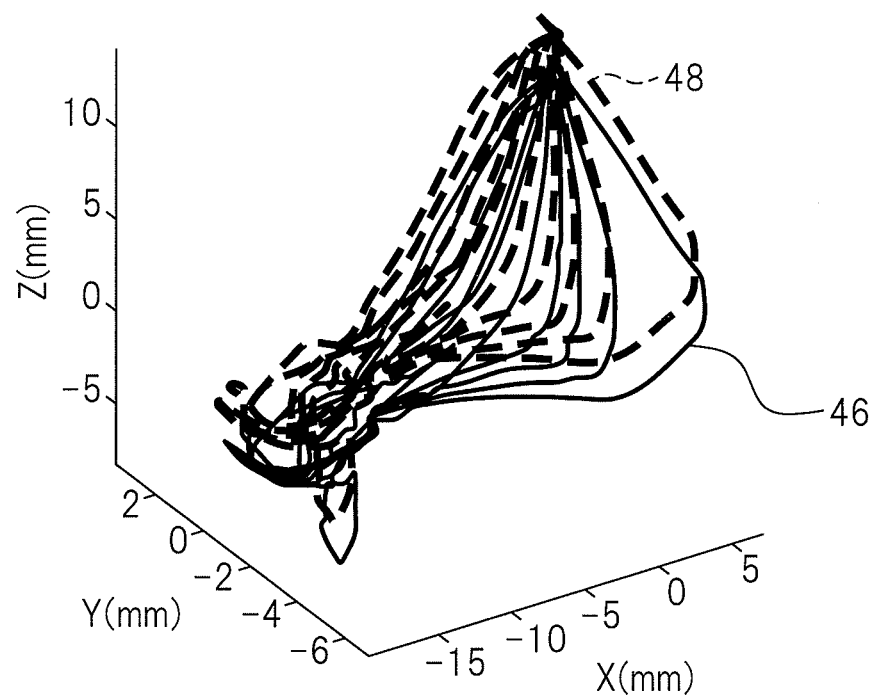
FIG. 7 is a diagram showing an example wherein two three-dimensional feedback trajectories are projected on a two-dimensional graph while being overlapped with each other.

Generally, the tool is moved by a plurality of drive axes, and thus the trajectory of the tool center point represents a complicated three-dimensional trajectory in many cases. Then, as shown in FIG. 7, it is very effective to project a plurality of (two in the illustrated embodiment) different three-dimensional feedback trajectories 46 and 48 on a two-dimensional plane so that the feedback trajectories are displayed on the same coordinate system while being overlapped with each other. Due to this, the two trajectories may be appropriately compared to each other, and the difference between them may be easily and visually observed. In addition, also in the case of FIG. 7, the error may be enlarged only in the error direction to be emphasized.

As in the above embodiments, when the feedback trajectory is overlapped with the commanded trajectory, or when the different feedback trajectories are overlapped with each other, it is preferable that the trajectories are displayed on the positional coordinate system, such as the X-Y plane, which does not include a time axis. Due to this, the error of the feedback trajectory relative to the commanded trajectory or the difference between the feedback trajectories overlapped with each other may be easily and visually observed.

Further, when the different feedback trajectories are overlapped with each other, as explained with reference to FIGS. 3 to 7, display attributes such as a color, a line type and a line thickness of each trajectory and/or displaying order of the trajectories may be properly selected in view of visual effect, etc.

According to the numerical controller of the present invention, by overlapping the feedback trajectory in each processing condition, and, if needed, by enlarging the feedback trajectories partially or in the error direction, the error of the processed shapes may be easily compared to each other, whereby an optimum processing condition may be searched or estimated rapidly and easily.

According to the invention, by overlapping the feedback trajectories of the different processing conditions, the change of the trajectory of the representative point of the tool, before and after the change of the processing condition, may be visually and accurately analyzed, whereby the parameter of the drive axis can be properly adjusted. Since both the feedback trajectory and the commanded trajectory are displayed on the positional coordinate system which does not include a time axis, an influence due to the movement speed or movement time of the tool can be ignored. Therefore, the difference between the trajectories can be more easily observed.

By overlapping the feedback trajectory with the commanded trajectory, the error of the feedback trajectory relative to the commanded trajectory may be easily and visually observed.

By projecting the three-dimensional feedback trajectory on the two-dimensional plane, even a complicated three-dimensional trajectory can be easily and visually observed.

By enlarging the error of the feedback trajectory relative to the commanded trajectory, or the difference between the feedback trajectories in the error direction only, the error or difference may be more easily observed.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A numerical controller comprising:
a numeric controlling part which controls at least one drive axis of a machine tool;
a tool coordinate calculating part which calculates a first feedback trajectory of a representative point of a tool based on position feedback of the drive axis and information of a mechanical structure of the machine tool;
a tool trajectory storing part which stores the first feedback trajectory; and
a displaying part which displays the first feedback trajectory,
wherein the displaying part displays at least one past second feedback trajectory which is stored in the tool trajectory storing part on the first feedback trajectory displayed on the displaying part so that the second feedback trajectory is overlapped with the first feedback trajectory on the same coordinate system, so that a change of the trajectory of the representative point of the tool, before and after changing a processing condition of the machine tool, can be visually compared,
wherein the displaying part displays a commanded trajectory of the representative point of the tool which is calculated based on a position command for controlling the drive axis and the information of the mechanical structure of the machine tool, and further displays one or more first and second feedback trajectories while overlapping the first and second feedback trajectories with the commanded trajectory,
wherein the commanded trajectory or the first and second feedback trajectories are obtained by projecting a three-dimensional trajectory on a two-dimensional plane,
wherein the displaying part displays an error of the first and second feedback trajectories relative to the commanded trajectory or an error between the first and second feedback trajectories, while enlarging the magnitude of the error only in an error direction, and
wherein the displaying part displays the first and second feedback trajectories based on selected display attributes of the first and second feedback trajectories.

2. The numerical controller as set forth in claim 1, wherein the first feedback trajectory and the second feedback trajectory are displayed on a positional coordinate system.

* * * * *